United States Patent [19]

Idel et al.

[11] 4,424,339

[45] Jan. 3, 1984

[54] PROCESS FOR THE PREPARATION OF POLYARYLENE SULPHIDES

[75] Inventors: Karsten Idel, Krefeld; Edgar Ostlinning, Duesseldorf; Dieter Freitag; Ludwig Bottenbruch, both of Krefeld, all of Fed. Rep. of Germany

[73] Assignee: Bayer Aktiengesellschaft, Leverkusen, Fed. Rep. of Germany

[21] Appl. No.: 417,048

[22] Filed: Sep. 13, 1982

[30] Foreign Application Priority Data

Sep. 25, 1981 [DE] Fed. Rep. of Germany ....... 3138178
Feb. 19, 1982 [DE] Fed. Rep. of Germany ....... 3205996

[51] Int. Cl.$^3$ .............................................. C08G 75/14
[52] U.S. Cl. ................................................... 528/388
[58] Field of Search ......................................... 528/388

[56] References Cited

U.S. PATENT DOCUMENTS

| 3,354,129 | 11/1967 | Edmonds, Jr. et al. | 528/388 |
| 3,763,124 | 10/1973 | Edmonds, Jr. | 528/388 |
| 3,919,177 | 11/1975 | Campbell | 528/373 |
| 4,116,947 | 9/1978 | Edmonds, Jr. et al. | 528/388 |
| 4,331,801 | 5/1982 | Idel et al. | 528/388 |
| 4,362,864 | 12/1982 | Idel et al. | 528/388 |

FOREIGN PATENT DOCUMENTS 23314 2/1981 European Pat. Off. .
2817731 11/1978 Fed. Rep. of Germany .

*Primary Examiner*—Melvyn I. Marquis
*Attorney, Agent, or Firm*—Connolly and Hutz

[57] ABSTRACT

Process for preparing polyarylensulfides by reacting dihalogenobenzenes, optionally substituted with polyhalogenoaromatic compounds with 3 or 4 halogeno substituents, and alkali metal sulfide in polar solvents using alkali metal sulfites and/or alkaline earth metal sulfites as catalysts.

5 Claims, No Drawings

PROCESS FOR THE PREPARATION OF POLYARYLENE SULPHIDES

Polyarylene sulphides are known (see U.S. Pat. Nos. 2,538,941 and 2,513,188). They can be prepared from the corresponding halogenoaromatics and alkali metal sulphides or alkaline earth metal sulphides. The reaction can be carried out using the substances as such, or polar solvents can be concomitantly used. Thus, according to the process described in U.S. Pat. No. 3,354,129, monomeric and polymeric sulphides are obtained by the reaction of at least one cyclic compound, which contains a double bond between adjacent ring atoms and which is substituted at least by a halogen atom, with an alkali metal sulphide in a polar solvent, such as an amide, lactam or sulphone, at an elevated temperature. Polyhalogen compounds can be employed as branching agents.

In DE-AS (German Published Specification) No. 2,453,749, carboxylates are claimed as reaction accelerators, and, in addition to alkali metal sulphides, organic thio compounds are also claimed as sulphur donors.

According to DE-OS (German Published Specification) No. 2,623,363 or U.S. Pat. No. 4,038,261, lithium chloride or lithium carboxylate are employed as catalysts for the preparation of arylene sulphide polymers. N-Methylpyrrolidone and alkali metal hydroxides complete the catalyst system.

Alkali metal carbonates in combination with alkali metal carboxylates are employed, according to U.S. Pat. No. 4,038,259, and lithium halides are employed, according to U.S. Pat. No. 4,038,263, as catalysts for the polyphenylene sulphide preparation.

According to DE-OS (German Published Specification) 2,623,362 or U.S. Pat. No. 4,038,262, lithium halides or alkali metal carboxylates are used as catalysts for the preparation of arylene sulphide polymers. N-Methylpyrrolidone and alkali metal hydroxides complete the catalyst system.

According to DE-OS (German Published Specification) No. 2,623,333 or U.S. Pat. No. 4,064,114, lithium acetate is used as the catalyst for the preparation of arylene sulphide polymers. N-Alkylpyrrolidones, and if appropriate alkali metal hydroxides and/or alkali metal carbonates as bases, complete the catalyst system. Alkali metal sulphonates are claimed in U.S. Pat. No. 4,038,260, and lithium carbonate and lithium borate are claimed in U.S. Pat. No. 4,039,518.

Polyarylene sulphides with a reduced melt fluidity can be obtained using tri-(alkali metal) phosphate catalysts (DE-OS (German Published Specification) No. 2,930,710) or alkali metal phosphonate catalysts (DE-OS (German Published Specification) No. 2,930,797).

In DE-OS (German Published Specification) No. 2,623,333, the dehydration customarily carried out before the reaction with dihalogenoaromatics in the polar solvent is carried out in two stages. The hydrate of the catalyst lithium acetate is first dehydrated, and subsequently, in a second step, the sodium sulphide dihydrate is dehydrated.

In general, the p-polyphenylene sulphides are subjected to a further hardening or curing step following the reaction (for example U.S. Pat. No. 3,717,620, U.S. Pat. No. 3,524,835 and U.S. Pat. No. 3,839,301), in which step it is intended to improve the properties via chain-lengthening and branching reactions.

Without this hardening step, the p-polyphenylene sulphides in general possess only a low melt viscosity, which does not permit thermoplastic processing.

According to U.S. Pat. No. 3,919,177, it is intended that it be possible, under selected conditions and with the aid of the catalyst lithium carboxylate, to melt-spin the p-polyphenylene sulphide produced without prior hardening, to give fibres. In U.S. Pat. No. 4,116,947 or DE-OS (German Published Specification) No. 2,817,731, it is intended that it be possible, by means of a particular amount of residual water and, if appropriate, in the presence of carboxylates, for the resulting p-polyphenylene sulphides to be extruded and spun into fibres, and to be moulded, without a hardening step.

The invention is based on the recognition of the fact that branched polyarylene sulphides having a high melt viscosity and a high molecular weight are obtained when dihalogenobenzenes and polyhalogenobenzenes and alkali metal sulphides are condensed in certain solvents and the reaction is carried out, in addition, in the presence of 0.02 to 0.3 mole (relative to 1 mole of alkali metal sulphide) of an alkali metal sulphite and/or alkaline earth metal sulphite. The polyarylene sulphides obtained can be moulded, extruded, and spun into fibres, without a hardening after-treatment. They have substantially improved mechanical properties in comparison with the polyarylene sulphides hitherto available commercially.

The subject of the invention is a process for the preparation of branched, high molecular weight polyarylene sulphides with a high melt viscosity, which is characterised in that (a) dihalogenobenzenes, of which 50 to 100 mole % correspond to the formula (I)

and 0 to 50 mole % correspond to the formula (II),

wherein

X is fluorine, chlorine, bromine and iodine, preferably chlorine and bromine, and $R^1$ is identical or different and can be hydrogen, $C_1$–$C_{20}$-alkyl, $C_5$–$C_{20}$-cycloalkyl, $C_6$–$C_{24}$-aryl, $C_7$–$C_{24}$-alkaryl or $C_7$–$C_{24}$-aralkyl, and/or two radicals $R^1$ can be linked to an aromatic or heterocyclic ring, and always at least one radical $R^1$ is different from hydrogen, and (b) 0.1 to 2.4 mole %, preferably 0.4 to 2.0 mole %, relative to the dihalogenobenzenes, of a polyhalogenoaromatic of the formula (III),

wherein
- Ar is an aromatic or heterocyclic radical having 6–24 C atoms and at least 3 free valences,
- X has the same meaning as in formula (I) and (II), and n is 3 or 4, and (c) an alkali metal sulphide, preferably sodium or potassium sulphide or a mixture thereof, preferably in the form of the hydrates or aqueous mixtures, if appropriate together with alkali metal hydroxides, are reacted in (d) a polar solvent, preferably an amide or lactam, particularly preferably a lactam or amide which is completely alkylated at the nitrogen, molar ratio of (a) to (c) being in the range from 0.85:1 to 1.15;1, preferably 0.95:1 to 1.05:1, and of (c) to (d) in the range from 1:2 to 1:15, a polycondensation time of up to 10 hours, preferably from 0.2 to 5 hours, and a polycondensation temperature from 160° to 300° C., preferably between 200° and 285° C., being maintained, and the reaction being carried out in the presence of 2 to 30 mole % (relative to alkali metal sulphide) of an alkali metal sulphite and/or alkaline earth metal sulphite of the formulae (IV) or (V), $$M_2SO_3 \quad (IV)$$

$$M'SO_3 \quad (V)$$

in which
- M denotes alkali metals, in particular lithium, sodium and potassium, and
- M' denotes alkaline earth metals, in particular magnesium and calcium.

Alkali metal sulphites are preferably used, and sodium sulphite and potassium sulphite are particularly preferably used. The sulphites according to the invention are usually employed in the form of their hydrates or their aqueous solutions, but can also be used in the anhydrous form when they are available in this form.

The alkali metal sulphides, preferably potassium sulphide and sodium sulphide, are also preferably employed in the form of their hydrates or aqueous mixtures. However, they can also be directly prepared in the reaction solution, from hydrogen sulphide and the corresponding alkali metal hydroxides or from the alkali metal hydrogen sulphides and the corresponding alkali metal hydroxides, according to a stoichiometric reaction. Mixtures of the alkali metal sulphides can also be employed.

Depending on the proportion of alkali metal hydrogen sulphide in the reaction solution, which alkali metal hydrogen sulphide is contained in the alkali metal sulphide as an impurity or is formed during the reaction process, alkali metal hydroxide is additionally metered in stoichiometrically to regenerate alkali metal sulphide. If appropriate, it is also possible to add, instead of the alkali metal hydroxides, those compounds which split off or form alkali metal hydroxides under the reaction conditions.

Lithium sulphide, sodium sulphide, potassium sulphide and rubidium sulphide, preferably sodium sulphide and potassium sulphide, are examples of alkali metal sulphides which are employed. Mixtures of the alkali metal sulphides can also be used.

Examples of suitable alkali metal hydroxides are lithium hydroxide, sodium hydroxide and potassium hydroxide, and mixtures thereof.

The alkali metal sulphides and/or the alkali metal sulphites or alkaline earth metal sulphites can be dehydrated in one or more steps, for example by distilling off the water from the reaction solution. The partial dehydration should be completed before the addition of the p-dihalogeno compounds of the formulae (I) and (II). The alkali metal sulphide and alkali metal sulphite or alkaline earth metal sulphite can be partially dehydrated either together or separately.

The combination of the reactants can be effected, in principle, in any desired form. The p-dihalogenoaromatics of the formulae (I) and (II) and the polyhalogenoaromatics of the formula (III) can be added together or separately, continuously, in portions or directly in one portion to the alkali metal sulphide, the solvent or a part thereof, and the alkali metal sulphites or alkaline earth metal sulphites of the formulae (IV) and (V).

However, it is also possible to add the alkali metal sulphide together with the solvent or a part thereof, and the sulphites of the formulae (IV) and (V) to the compounds of the formulae (I) and (II) and the polyhalogenoaromatics (III). It is also possible directly to combine all reactants. Any other combination of the reactants is also possible.

Examples of the p-dihalogenoaromatics to be employed according to the invention, of the formula (I), are: p-difluorobenzene, p-dichlorobenzene, p-dibromobenzene, p-diiodobenzene, 1-fluoro-4-chlorobenzene, 1-fluoro-4-bromobenzene, 1-chloro-4-bromobenzene, 1-chloro-4-iodobenzene and 1-bromo-4-iodobenzene. They can be used alone or mixed with one another. Preferred are p-dichlorobenzene and p-dibromobenzene.

Examples of the p-halogenoaromatics to be employed according to the invention, of the formula (II), are: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene and 1-hexyl-2,5-dichlorobenzene. They can be employed alone or mixed with one another.

Examples of the polyhalogenoaromatics to be employed according to the invention, of the formula (III), are: 1,2,3-trichlorobenzene, 1,2,4-trichlorobenzene, 1,2,4-tribromobenzene, 1,2,4-triiodobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene, 2,2'-4,4'-tetrachlorobiphenyl and 1,3,5-trichlorotriazine.

In general, any polar solvent which ensures sufficient solubility of the organic and inorganic reactants under the reaction conditions can be employed for the reaction. However, amides and lactams are preferably used, and N-alkylated amides and lactams are particularly preferably used.

In the context of the present invention, lactams are those of amino acids having 3 to 5 C atoms, which optionally can carry substituents on the carbon skeleton which are inert under the reaction conditions, such as, for example, an alkyl radical having 1 to 5 C atoms.

In the context of the present invention, N-alkyl-lactams are defined as the lactams according to the invention, but additionally carry, on the nitrogen atom, an alkyl radical having 1 to 6 C atoms.

Examples of suitable solvents are: N,N'-dimethylacetamide, N,N'-diethylacetamide, N,N'-diethylacetamide, N,N'-dipropylacetamide, N,N'-dimethylbenzoic acid amide, caprolactam, N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-isobutyl-2-piperidone, N-methyl-6-methyl-2-piperidone, N-methyl-3-ethyl-2-piperidone, N-methyl-2-oxo-hexamethyleneimine and N-ethyl-2-oxo-hexamethyleneimine.

Mixtures of the above solvents can also be chosen.

The condensation temperature is as a rule 160° to 300° C., preferably 200° to 285° C. The reaction time can be up to 10 hours, but is preferably between 0.2 and 5 hours. A step-wise increase in the reaction temperature during this time is advantageous. Because the condensation temperature is generally higher than the boiling point of the solvent, the application of additional pressure is automatically necessary.

The dihalogenobenzene and the alkali metal sulphide are reacted in equimolar amounts, as far as possible. Accordingly, the molar ratio dihalogenobenzene/alkali metal sulphide is preferably in the range from 0.95:1 to 1.05:1. However, it can be extended to the range 0.85:1 to 1.15:1.

The polyhalogenoaromatics to be employed according to the invention, of the formula (III), can be added up to an amount of several mole %, relative to the proportion of dihalogenobenzene, either together with the p-dihalogenobenzenes or separately, depending on the experimental conditions, but as a rule a proportion of 0.1 to 2.4 mole %, preferably 0.4 to 2.0 mole %, relative to the proportion of dihalogenobenzene, will be sufficient.

The amount of solvent can be chosen within a wide range, but is in general from 2 to 15 moles per mole of alkali metal sulphide.

The working-up of the reaction mixture can be effected in a variety of ways.

The polyarylene sulphide can be separated off by a customary procedure, for example by filtration or by centrifuging, either directly from the reaction solution or only after the addition, for example, of water.

In general, the filtration is followed by a wash with water to remove inorganic constituents which can adhere to the polymers, such as, for example, residues of alkali metal sulphides and alkali metal chlorides.

A wash or extraction with other wash liquids, which can also be carried out additionally or subsequently to this wash, is of course also possible.

The polymer can also be obtained by stripping the solvent from the reaction space, followed by washing, as described above.

The polyarylene sulphides according to the invention can also be mixed with other polymers, with pigments and fillers such as, for example, graphite, metal powders, glass powders, ground quartz or glass fibres, or the additives customary for polyarylene sulphides, such as, for example, customary stabilisers or mould release agents, can be added to them.

In general, the melt fluidity of polyarylene sulphides is measured according to ASTM 1238-70, at 316° C. using a 5 kg weight, and is given in g/10 min.

However, in the case of high melt indeces, this measurement can present difficulties owing to the high efflux rate of the polymer melt.

The melt viscosity $\eta_m$ of the polymer melt (in Pa.s) was therefore determined at 306° C. as a function of the shearing force $\tau$ (in Pa), with the aid of the Instron rotation viscosimeter.

In this manner, the melt viscosity can be determined precisely within a very wide range of $10^{-1}$ to $10^7$ Pa.s. In the Instron rheometer, the polymer is melted between a fixed plate and a rotatable cone, and the torque of the cone is determined. From the torque, the angular viscosity and the data of the apparatus, the melt viscosity can be calculated as a function of the shearing force. The model 3250 rheometer from Instron was used; diameter of the cone and the plate 2 cm.

The melt viscosity which is measured at a shearing force of $\tau = 10^2$ Pa is given.

The p-polyarylene sulphides according to the invention possess in general melt viscosities of $0.5 \times 10^3$ to $5 \times 10^5$ Pa.s and higher, but preferably from $1.5 \times 10^3$ to $10^4$ Pa.s, directly after isolation from the reaction mixture. They can be directly processed by extrusion, blow extrusion, injection moulding or other customary processing techniques to give films, moulded articles or fibres, which are used in the customary manner as automobile components, armatures, electronic components, for example switches, electronic panels, chemical-resistant components and apparatuses, such as pump housings and pump impellers, etching bath dishes, sealing washers, components of office machines and communications equipment, and domestic appliances, valves, ballbearing components, etc.

EXAMPLE 1

This example describes, for comparison, the preparation of polyphenylene sulphide according to U.S. Pat. No. 3,354,129.

129 g of sodium sulphide trihydrate (corresponding to 1 mole of Na$_2$S) and 300 g of N-methyl-2-pyrrolidone were combined in an autoclave equipped with a stirrer. The mixtures was flushed with nitrogen and slowly warmed up to 202° C. A total of 19 ml of water distilled off during this operation. The mixture was then cooled down to approx. 160° C., and 147 g of p-dichlorobenzene (=1 mole) in approx. 50 g of N-methyl-2-pyrrolidone were added. The reaction mixture is warmed to 245° C. in the course of 30 minutes under the initial nitrogen pressure of 2.5 bar, the pressure increasing to 10 bar, and this temperature is maintained for 3 hours. After the mixture has cooled to romm temperature, a grey solid is isolated, which is then subjected to careful washing with water to remove the admixed inorganic constituents.

The product is dired in vacuo at 80° C., and 100.3 g (93%) of poly-p-phenylene-sulphide with the following parameters are obtained: melt viscosity $\eta m = 4.5$ Pa.s (at $\tau = 10^2$ Pa). Thermoplastic processing is not possible without hardening.

EXAMPLE 2 191.6 of sodium sulphide hydrate (1.455 moles) and 18.9 g of sodium sulphite hydrate (Na$_2$SO$_3$.7H$_2$O) (5 mole %, relative to moles of sodium sulphide), and appropriate amount of sodium hydroxide to neutralise sodium hydrogen sulphide contained in the mixture, are initially introduced into 500 g of N-methylpyrrolidone. By slowly heating the mixture up to 175° C., 35.0 ml of a distillate which contains water as the major constituent is obtained.

220.5 g of p-dichlorobenzene (1.50 moles) and 2.72 g (0.015 mole) of 1,2,4-trichlorobenzene in 70 ml of N-methylpyrrolidone are then added, and after the autoclave has been closed the reaction mixture is brought from 200° C. to 270° C. in the course of 90 minutes, and is kept at this temperature for 120 minutes.

After the end of the reaction, the autoclave is allowed to cool to 150° C., the pressure is released, and the reaction mixture is removed. The p-polyphenylene sulphide formed is separated off, and carefully freed from adhering salts, using water. After drying, the p-polyphenylene sulphide is isolated as a grey-white solid. Melt viscosity $\eta m = 1450$ Pa.s (at $\tau = 10^2$ Pa).

EXAMPLE 3

As for Example 2, but with 10 mole % of sodium sulphite hydrate. Melt viscosity $\eta m = 1800$ Pa.s (at $\tau = 10^2$ Pa).

EXAMPLE 4

As for Example 2, but with 3.54 g (0.0195 mole) of 1,2,4-trichlorobenzene. Melt viscosity $\eta m = 2200$ Pa.s (at $\tau = 10^2$ Pa).

EXAMPLE 5

As for Example 2, but with 20 mole % of sodium sulphite hydrate. Melt viscosity $\eta m = 2350$ Pa.s (at $\tau = 10^2$ Pa).

EXAMPLE 6

As for example 2, but with 28.3 g of potassium sulphite hydrate K$_2$SO$_3$.2H$_2$O (10. mole %, relative to moles of sodium sulphide). Melt viscosity $\eta m = 1900$ Pa.s (at $\tau = 10^2$ Pa).

For comparison, the melt viscosity of a commercially available thermally untreated p-polyphenylene sulphide from Phillips Petroleum Comp., Ryton V1®, is $\eta m = 3.5$ Pa.s (at $\tau = 10^2$ Pa), and is thus substantially lower than the melt viscosity of the p-polyphenylene sulphides according to the invention which are described in the examples.

The thermoplastically processible, commercially available p-polyphenylene sulphide Ryton P4® from Phillips Petroleum Comp. is presumably obtained by an additional thermal after-treatment. In spite of this additional after-treatment, the commercially available, thermoplastically processible p-polyphenylene sulphide has mechanical properties inferior to those of the p-polyphenylene sulphide according to the invention, which p-polyphenylene sulphide is obtained directly in one step (see Table 1).

TABLE 1

| Property | Unit of measurement | Test procedure | Commercial product thermoplastically processible p-polyphenylene sulphide | p-polyphenylene sulphide from Example 4 | and | Example 6 |
| --- | --- | --- | --- | --- | --- | --- |
| Tensile strength | MPa | DIN 53 455 | 43.06 | 44.2 | | 45.7 |
| Elongation at break | % | DIN 53 455 | 0.9 | 8.3 | | 10.9 |
| Tensile modulus of elasticity | MPa | DIN 53 455 | 4400 | 3800 | | 3300 |
| Flexural strength | MPa | DIN 53 452 | 77.8 | 108 | | 128 |
| Flexural modulus of elasticity | MPa | DIN 53 452 | 3820 | 3970 | | 4220 |
| Ball indentation hardness | MPa | DIN 53 456 | 64.7 | 110.5 | | 160.2 |
| Impact strength | kJ/m$^2$ | DIN 53 453 | 3.5 | 16.7 | | 22.8 |
| Notched impact strength | kJ/m$^2$ | DIN 53 453 | 0.9 | 1.2 | | 1.8 |

We claim:
1. Process for the preparation of high molecular weight branched polyarylene sulphides, characterised in that
   (a) dihalogenobenzenes, of which 50 to 100 mole % correspond to the formula I

and 0 to 50 mole % correspond to the formula II

wherein
X is fluorine, chlorine, bromine or iodine, and
R$^1$ is identical or different and is hydrogen, C$_1$–C$_{20}$-alkyl, C$_5$–C$_{20}$-cycloalkyl, C$_6$–C$_{24}$-aryl, C$_7$–C$_{24}$-alkaryl or C$_7$–C$_{24}$-aralkyl, or at least one pair of radicals R$^1$ can be linked to an aromatic or heterocyclic ring, and always at least one radical R$^1$ is different from hydrogen, and
   (b) 0.1 to 2.4 mole %, relative to the dihalogenobenzenes, of a polyhalogenoaromatic of the formula III, $$ArX_n \qquad (III)$$

wherein
Ar is a trivalent or tetravalent aromatic or heterocyclic radical having 6–24 C atoms,
X has the same meaning as in formula I and II, and
n=3 or 4, and
(c) an alkali metal sulphide are reacted in
(d) a polar solvent, the molar ratio of (a) to (c) being in the range from 0.85:1 to 1.15:1, and (c) to (d) in the range from 1:2 to 1:15, a polycondensation time of up to 10 hours and a polycondensation temperature from 160° to 300° C. being maintained, and the reaction being carried out in the presence of 2 to 30 mole %, relative to alkali metal sulphide, of an alkali metal sulphite and/or alkaline earth metal sulphite.

2. Process according to claim 1, characterised in that p-dichlorobenzene or p-dibromobenzene is employed as component (a).

3. Process according to claim 1, characterised in that 0.4 to 2.0 mole %, relative to dihalogenobenzene, of a polyhalogenoaromatic of the formula III is employed.

4. Process according to claim 1, characterised in that 2 to 30 mole %, relative to alkali metal sulphide, of sodium sulphite or potassium sulphite are employed.

5. Process according to claim 1, characterised in that at least one amide completely alkylated at the nitrogen is employed as solvent.

* * * * *